US012693153B2

(12) United States Patent
An et al.

(10) Patent No.: US 12,693,153 B2
(45) Date of Patent: Jul. 28, 2026

(54) LIGHT SOURCE CORRECTION METHOD FOR LOW-LIGHT DETECTION

(71) Applicants: Wuchang University of Technology, Wuhan City (CN); Hubei Zhouhui Automotive Technology Co., Ltd., Shiyan City (CN)

(72) Inventors: Qing An, Wuhan City (CN); Qinzhou Wei, Shiyan City (CN); Bing Fu, Shiyan City (CN); Lei Yan, Wuhan City (CN); Yaqiong Li, Wuhan City (CN); Ying He, Wuhan City (CN); Qian Deng, Wuhan City (CN)

(73) Assignees: Wuchang University of Technology, Wuhan City (CN); Hubei Zhouhui Automotive Technology Co., Ltd., Shiyan City (CN)

( * ) Notice: Subject to any disclaimer, the term of this patent is extended or adjusted under 35 U.S.C. 154(b) by 128 days.

(21) Appl. No.: 18/905,422

(22) Filed: Oct. 3, 2024

(65) Prior Publication Data

US 2026/0098754 A1 Apr. 9, 2026

(51) Int. Cl.
*G01J 1/02* (2006.01)
*G01J 1/04* (2006.01)
*G01J 1/10* (2006.01)
G01J 1/08 (2006.01)

(52) U.S. Cl.
CPC .......... *G01J 1/0295* (2013.01); *G01J 1/0271* (2013.01); *G01J 1/0403* (2013.01); *G01J 1/0407* (2013.01); *G01J 1/10* (2013.01); *G01J 2001/086* (2013.01)

(58) Field of Classification Search
CPC ...... G01J 1/0295; G01J 1/0271; G01J 1/0403; G01J 1/0407; G01J 1/10; G01J 2001/086
See application file for complete search history.

(56) References Cited

U.S. PATENT DOCUMENTS

| | | | | |
|---|---|---|---|---|
| 5,525,793 | A | * | 6/1996 | Holmes ................ G01C 21/025 |
| | | | | 250/203.1 |
| 2014/0268116 | A1 | * | 9/2014 | Fant ...................... G01J 1/4228 |
| | | | | 356/226 |

FOREIGN PATENT DOCUMENTS

| | | | | | |
|---|---|---|---|---|---|
| CN | 101936772 | A | * | 1/2011 | |
| CN | 104897279 | A | * | 9/2015 | |
| CN | 109752090 | A | * | 5/2019 | ................ G01J 1/42 |
| EP | 3988357 | A1 | * | 4/2022 | ............. B60R 11/00 |

(Continued)

*Primary Examiner* — Georgia Y Epps
*Assistant Examiner* — Erin R Garber
(74) *Attorney, Agent, or Firm* — Thomas Horstemeyer, LLP

(57) ABSTRACT

Provided is a light source correction method for low-light detection, which relates to the technical field of remote detection. The light source correction method includes following steps: S1: determining whether brightness of a light source exceeds a predetermined value, and if the brightness of the light source exceeds the predetermined value, performing step S2; or if the brightness of the light source does not exceed the predetermined value, performing no operation; S2: driving a shielding plate located in front of a luminous flux detection board to rotate around a rotating shaft to obtain a luminous flux intensity on the luminous flux detection board; and S3: drawing a curve graph showing that the luminous flux intensity varies with a rotation position of the shielding plate, and calculating position information of the light source.

8 Claims, 1 Drawing Sheet

(56)                       References Cited

FOREIGN PATENT DOCUMENTS

| JP | 2003000538 | A | * | 1/2003 | |
| JP | 2008089837 | A | * | 4/2008 | |
| WO | WO-2019232699 | A1 | * | 12/2019 | ............ G01J 1/0474 |

* cited by examiner

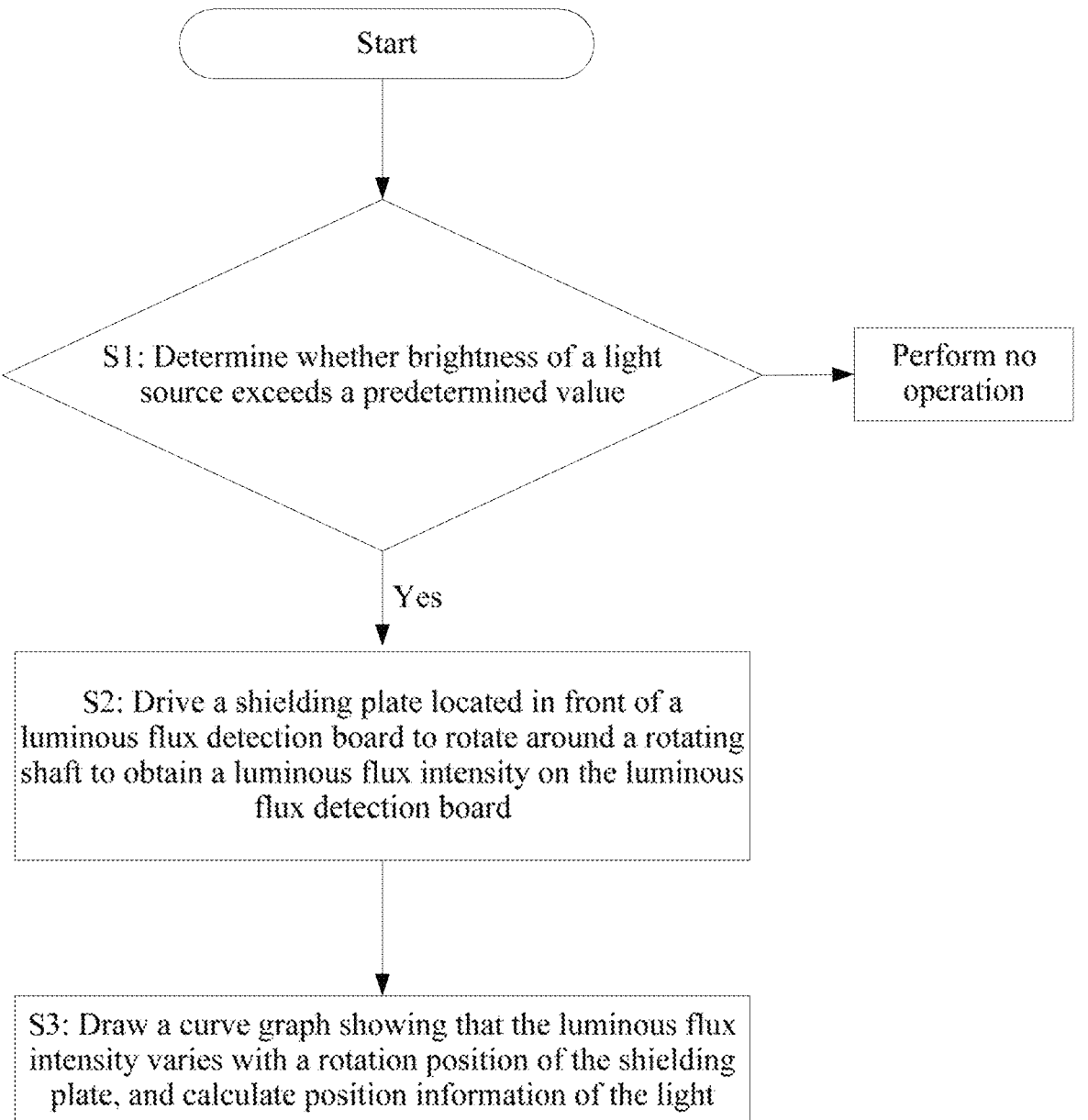

LIGHT SOURCE CORRECTION METHOD FOR LOW-LIGHT DETECTION

TECHNICAL FIELD

The present disclosure relates to the technical field of remote detection, and in particular, to a light source correction method for low-light detection.

BACKGROUND

With the development of science and technology, more long-distance detection techniques are developed now. Methods used for long-distance detection include optical detection, ultrasonic detection, infrared temperature-sensing detection, and the like. In deep-space and deep-sea environments, a detection target has weak light, and the optical detection has very low accuracy. In many environments, the ultrasonic detection and the infrared temperature-sensing detection cannot be used either. Therefore, a unique low-light imaging detection technology is needed.

A low-light imaging detector is widely applied in scientific research and national defense construction. In low-light imaging detection, fewer optical components need to be used to a larger field range and a higher system transmission efficiency to reduce a size and a weight of an instrument, expand a field range of the instrument, and improve imaging quality of the instrument. For example, an existing patent CN105424176A provides a low-light imaging detector, including: a housing, an input window, a photocathode layer, a microchannel plate image intensifier, an induction coding anode, a vacuum electrode, and an electrode lead. The input window and the metal housing constitute a closed high vacuum environment, and the photocathode layer, the microchannel plate image intensifier, the induction coding anode, and the anode lead are all placed in the high vacuum environment. The low-light imaging detector can effectively reduce an aberration of a detected image, reduce a quantity of optical components used, and improve imaging quality, and has advantages of a simple structure, a reasonable design, a simple preparation process, a high preparation efficiency, good quality, and the like.

However, the above low-light imaging detection method still has following drawbacks: A structure is complex. Before low-light detection, a low-light light source is not corrected and needs to be searched for. As a result, the above photocathode layer, microchannel plate image intensifier, induction coding anode, and anode lead need to be started for a plurality of times. This is time-consuming and energy-consuming, and results in a low detection efficiency after long-term use. Moreover, the devices are easily damaged and maintenance is very complicated. Especially for a remote multi-point low-light light source, a correction capability is almost zero.

Therefore, in order to solve the above problems, it is necessary to design a reasonable and efficient light source correction method for low-light detection.

SUMMARY

An objective of the present disclosure is to provide a light source correction method for low-light detection, which adds a correction device to a low-light detector to effectively position and correct a remote multi-point low-light light source before the low-light detector is officially used. The low-light detector does not need to search for the light source, but directly uses correction information to further detect low light, effectively improving detection efficiency. The low-light detector is not easily damaged and has a long service life.

To achieve the above objective, the present disclosure is implemented by adopting following technical solutions:

A light source correction method for low-light detection, including following steps:

S1: determining whether brightness of a light source exceeds a predetermined value, and if the brightness of the light source exceeds the predetermined value, performing step S2; or if the brightness of the light source does not exceed the predetermined value, performing no operation;

S2: driving a shielding plate located in front of a luminous flux detection board to rotate around a rotating shaft to obtain a luminous flux intensity on the luminous flux detection board; and S3: drawing a curve graph showing that the luminous flux intensity varies with a rotation position of the shielding plate, and calculating position information of the light source.

As a preferred solution of the present disclosure, the luminous flux detection board is a circular board that is uniformly provided with a luminous flux detector, the luminous flux detection board is arranged parallel to the shielding plate, and the rotating shaft is arranged coaxially with the circular board.

As a preferred solution of the present disclosure, the shielding plate is a fan-shaped plate.

As a preferred solution of the present disclosure, when the step S3 is performed, the shielding plate rotates at least three times around the rotating shaft; the curve graph showing that the luminous flux intensity varies with the rotation position of the shielding plate is drawn, where a horizontal axis of the curve graph represents a rotation angle of the shielding plate, and a vertical axis of the curve graph represents the luminous flux intensity; an abnormal value is eliminated; and the position information of the light source is calculated based on the variation curve graph.

As a preferred solution of the present disclosure, there is at least one correction device constituted by the luminous flux detection board and the shielding plate; and a plurality of correction devices are arranged in an array; and when the step S3 is performed, a plurality of curve graphs showing that the luminous flux intensity varies with the rotation position of the shielding plate are drawn, position information of the light source under each variation curve graph is calculated, and the position information of the light source is corrected based on a plurality of pieces of position information of the light source and a position of the correction device.

As a preferred solution of the present disclosure, in the correction devices, distances between the luminous flux detection boards and the shielding plates are different;

when the step S3 is performed, the curve graphs showing that the luminous flux intensity varies with the rotation position of the shielding plate are drawn, the position information of the light source under each variation curve graph is calculated, and the position information of the light source is corrected based on the plurality of pieces of position information of the light source and the position of the correction device; and when the rotation position of the shielding plate is the same, luminous flux intensities under different distances between the luminous flux detection boards and the shielding plates are selected to calculate distance information of the light source.

As a preferred solution of the present disclosure, before the step S2 is performed, the rotating shaft is driven to face towards a direction of the light source.

As a preferred solution of the present disclosure, an outer side of the luminous flux detection board is provided with a cylindrical shielding cylinder coaxially arranged with the rotating shaft, the luminous flux detection board is disposed at an end of the shielding cylinder away from the light source, and the shielding plate is disposed at an end of the shielding cylinder close to the light source.

As a preferred solution of the present disclosure, in the correction devices, each shielding plate has a different fan-shaped angle;

when the step S3 is performed, the curve graphs showing that the luminous flux intensity varies with the rotation position of the shielding plate are drawn, the position information of the light source under each variation curve graph is calculated, and the position information of the light source is corrected based on the plurality of pieces of position information of the light source and the position of the correction device; and when the rotation position of the shielding plate is the same, the luminous flux intensities under the different distances between the luminous plate are selected to calculate the distance information of the light source.

The light source correction method for low-light detection in the present disclosure has following beneficial effects:

The correction device is added to a low-light detector to effectively position and correct a remote multi-point low-light light source before the low-light detector is officially used. The low-light detector does not need to search for the light source, but directly uses correction information to further detect low light, effectively improving detection efficiency. The low-light detector is not easily damaged and has a long service life.

BRIEF DESCRIPTION OF THE DRAWINGS

To describe the technical solutions in the embodiments of the present disclosure more clearly, the accompanying drawings required for describing the embodiments are briefly described below. Apparently, the accompanying drawings in the following description show merely some embodiments of the present disclosure, and those of ordinary skill in the art may still derive other accompanying drawings from these accompanying drawings without creative efforts.

FIG. 1 is a schematic diagram of a preparation process of a light source correction method for low-light detection according to an embodiment of the present disclosure.

DETAILED DESCRIPTION OF THE EMBODIMENTS

The following describes the technical solutions in the embodiments of the present disclosure clearly and completely with reference to the accompanying drawings in the embodiments of the present disclosure.

In the following description, terms such as "first" and "second" are merely intended for the purpose of description, and should not be construed as indicating or implying relative importance. The following description provides a plurality of embodiments of the present disclosure, and different embodiments can be replaced or combined. Therefore, the present disclosure can also be considered to include all possible combinations of the same and/or different embodiments described. Therefore, if one embodiment includes features A, B, and C, and another embodiment includes features B and D, the present disclosure should also be considered to include embodiments containing one or more other possible combinations of A, B, C, and D, although such embodiments may not be explicitly described in the following content.

The following description provides examples and does not limit the scope, applicability, or example set forth in the claims. Changes can be made to a function and an arrangement of a described element without departing from the scope of the present disclosure. In various examples, various processes or components may be omitted, replaced, or added appropriately. For example, the described method can be executed in an order different from the described order, and various steps can be added, omitted, or combined. In addition, features described about some examples can be combined into other examples.

Embodiment 1: Referring to FIG. 1, a light source correction method for low-light detection includes following steps:

S1: Determine whether brightness of a light source exceeds a predetermined value, and if the brightness of the light source exceeds the predetermined value, perform step S2; or if the brightness of the light source does not exceed the predetermined value, perform no operation.

S2: Drive a shielding plate located in front of a luminous flux detection board to rotate around a rotating shaft to obtain a luminous flux intensity on the luminous flux detection board.

S3: Draw a curve graph showing that the luminous flux intensity varies with a rotation position of the shielding plate, and calculate position information of the light source.

It should be noted that in the present disclosure, the luminous flux detection board and the shielding plate in front of the luminous flux detection board structurally need to meet following requirements:

The luminous flux detection board is a circular board that is uniformly provided with a luminous flux detector, the luminous flux detection board is arranged parallel to the shielding plate, and the rotating shaft is arranged coaxially with the circular board.

Further, the shielding plate is a fan-shaped plate.

That is, the shielding plate rotates once to form a circular region that is parallel to the luminous flux detection board (circular board). Optimally, the circular region has a same radius as the luminous flux detection board (circular board), and the rotating shaft is coaxially arranged with the circular board. This is equivalent to that when the shielding plate rotates, projections behind the shielding plate fall within different regions of the circular board in sequence.

Moreover, the circular board is uniformly provided with the luminous flux detector. The present disclosure is to obtain a light shielding change of the circular plate under the rotation of the shielding plate.

Next, each step of the present disclosure is described in detail:

S1: Determine whether the brightness of the light source exceeds the predetermined value, and if the brightness of the light source exceeds the predetermined value, perform the step S2; or if the brightness of the light source does not exceed the predetermined value, perform no operation.

Firstly, whether there is a to-be-detected low-light light source is roughly determined. If brightness of the low-light light source is too low, there is no need for detection. On the contrary, once the brightness of the low-light light source reaches a detection requirement, the low-light light source needs to be detected.

S2: Drive the shielding plate located in front of the luminous flux detection board to rotate around the rotating shaft to obtain the luminous flux intensity on the luminous flux detection board.

It should be noted that, before the step S2 is performed, the rotating shaft is driven to face towards a direction of the light source.

Therefore, when the step S2 is performed, after the rotating shaft faces towards the direction of the light source, the shielding plate located in front of the luminous flux detection board is driven to rotate around the rotating shaft to obtain a change in the luminous flux intensity on the luminous flux detection board when the shielding plate rotates around the rotating shaft, in other words, the light shielding change of the circular board when the shielding plate rotates around the rotating shaft.

S3: Draw the curve graph showing that the luminous flux intensity varies with the rotation position of the shielding plate, and calculate the position information of the light source.

When the step S3 is performed, the shielding plate rotates at least three times around the rotating shaft. The curve graph showing that the luminous flux intensity varies with the rotation position of the shielding plate is drawn, where a horizontal axis of the curve graph represents a rotation angle of the shielding plate, and a vertical axis of the curve graph represents the luminous flux intensity. An abnormal value is eliminated. The position information of the light source is calculated based on the variation curve graph.

Certainly, after the step S3 is performed, the calculated position information of the light source is sent to a body of a low-light detector, and the body of the low-light detector detects low light in a targeted manner based on information of the low light.

Embodiment 2: Still referring to FIG. 1, in the light source correction method for low-light detection in the present disclosure, As an embodiment of the present disclosure, there is at least one correction device constituted by the luminous flux detection board and the shielding plate; and a plurality of correction devices are arranged in an array.

When the step S3 is performed, a plurality of curve graphs showing that the luminous flux intensity varies with the rotation position of the shielding plate are drawn, position information of the light source under each variation curve graph is calculated, and the position information of the light source is corrected based on a plurality of pieces of position information of the light source and a position of the correction device.

As an embodiment of the present disclosure, in the correction devices, distances between the luminous flux detection boards and the shielding plates are different.

When the step S3 is performed, the curve graphs showing that the luminous flux intensity varies with the rotation position of the shielding plate are drawn, the position information of the light source under each variation curve graph is calculated, and the position information of the light source is corrected based on the plurality of pieces of position information of the light source and the position of the correction device.

When the rotation position of the shielding plate is the same, luminous flux intensities under different distances between the luminous flux detection boards and the shielding plates are selected to calculate distance information of the light source.

Embodiment 3: Still referring to FIG. 1, in the light source correction method for low-light detection in the present disclosure, An outer side of the luminous flux detection board is provided with a cylindrical shielding cylinder coaxially arranged with the rotating shaft, the luminous flux detection board is disposed at an end of the shielding cylinder away from the light source, and the shielding plate is disposed at an end of the shielding cylinder close to the light source.

In the correction devices, each shielding plate has a different fan-shaped angle.

Therefore, when the step S3 is performed, the curve graphs showing that the luminous flux intensity varies with the rotation position of the shielding plate are drawn, the position information of the light source under each variation curve graph is calculated, and the position information of the light source is corrected based on the plurality of pieces of position information of the light source and the position of the correction device.

When the rotation position of the shielding plate is the same, the luminous flux intensities under the different distances between the luminous plate are selected to calculate the distance information of the light source.

In the light source correction method for low-light detection in the present disclosure, the correction device is added to the low-light detector to effectively position and correct a remote multi-point low-light light source before the low-light detector is officially used. The low-light detector does not need to search for the light source, but directly uses correction information to further detect low light, effectively improving detection efficiency. The low-light detector is not easily damaged and has a long service life.

Described above are merely exemplary embodiments of the present disclosure, which cannot be construed as a limitation on the scope of the present disclosure. Any equivalent changes and modifications made in accordance with the teachings of the present disclosure still fall within the scope of the present disclosure. A person skilled in the art can easily think of other implementation solutions of the present disclosure after considering the specification and practicing the disclosure herein. The present disclosure is intended to cover any variations, purposes, or adaptive changes of the present disclosure. Such variations, purposes, or adaptive changes follow the general principle of the present disclosure and include common knowledge or conventional technical means in the technical field which is not disclosed in the present disclosure. The specification and embodiments are merely considered as illustrative, and the scope and spirit of the present disclosure are defined by the claims.

What is claimed is:

1. A light source correction method for low-light detection, comprising the following steps:

S1: determining whether brightness of a light source exceeds a predetermined value, and if the brightness of the light source exceeds the predetermined value, performing step S2; or if the brightness of the light source does not exceed the predetermined value, performing no operation;

S2: driving a shielding plate located in front of a luminous flux detection board to rotate around a rotating shaft to obtain a luminous flux intensity on the luminous flux detection board; and S3: drawing a curve graph showing that the luminous flux intensity varies with a rotation position of the shielding plate, and calculating position information of the light source.

2. The light source correction method for low-light detection according to claim 1, wherein the luminous flux detection board is a circular board that is uniformly provided with a luminous flux detector, the luminous flux detection board is arranged parallel to the shielding plate, and the rotating shaft is arranged coaxially with the circular board.

3. The light source correction method for low-light detection according to claim 1, wherein the shielding plate is a fan-shaped plate.

4. The light source correction method for low-light detection according to claim 3, wherein when the step S3 is performed, the shielding plate rotates at least three times around the rotating shaft; the curve graph showing that the luminous flux intensity varies with the rotation position of the shielding plate is drawn, wherein a horizontal axis of the curve graph represents a rotation angle of the shielding plate, and a vertical axis of the curve graph represents the luminous flux intensity; an abnormal value is eliminated; and the position information of the light source is calculated based on the curve graph.

5. The light source correction method for low-light detection according to claim 4, wherein there is at least one correction device constituted by the luminous flux detection board and the shielding plate; and a plurality of correction devices are arranged in an array; and when the step S3 is performed, a plurality of curve graphs showing that the luminous flux intensity varies with the rotation position of the shielding plate are drawn, position information of the light source under each of the plurality of curve graphs, and the position information of the light source is corrected based on a plurality of pieces of position information of the light source and a position of the correction device.

6. The light source correction method for low-light detection according to claim 5, wherein in the plurality of correction devices, distances between the luminous flux detection boards and the shielding plates are different; when the step S3 is performed, the curve graphs showing that the luminous flux intensity varies with the rotation position of the shielding plate are drawn, the position information of the light source under each of the curve graphs is calculated, and the position information of the light source is corrected based on the plurality of pieces of position information of the light source and the position of the correction device; and when the rotation position of the shielding plate is the same, luminous flux intensities under different distances between the luminous flux detection boards and the shielding plates are selected to calculate distance information of the light source.

7. The light source correction method for low-light detection according to claim 1, wherein before the step S2 is performed, the rotating shaft is driven to face towards a direction of the light source.

8. The light source correction method for low-light detection according to claim 7, wherein an outer side of the luminous flux detection board is provided with a cylindrical shielding cylinder coaxially arranged with the rotating shaft, the luminous flux detection board is disposed at an end of the shielding cylinder away from the light source, and the shielding plate is disposed at an end of the shielding cylinder close to the light source.

* * * * *